United States Patent [19]

Augspurger

[11] 3,854,470

[45] Dec. 17, 1974

[54] REPRODUCTION PROCESSES FOR CELLULAR BODIES

[76] Inventor: Lynn Lawrence Augspurger, 642 Fairfax, Birmingham, Mich. 48009

[22] Filed: Nov. 23, 1973

[21] Appl. No.: 418,604

[52] U.S. Cl.................... 128/1 R, 424/100, 424/85, 195/1.8
[51] Int. Cl....................... A61k 17/00, A61k 17/06
[58] Field of Search............... 128/1 R; 424/85, 100; 195/1.8

[56] References Cited
UNITED STATES PATENTS

| | | | |
|---|---|---|---|
| 3,574,829 | 4/1971 | Wagner et al. | 424/100 |
| 3,687,806 | 8/1972 | Bovenkamp | 128/1 R |

OTHER PUBLICATIONS

The Vetinary Annual 1969–pages 201–215–Ovum Transplant in Domestic Animals–L. E. A. Rowson.
Reproduction in Mammals–Artificial Control of Reproduction, 1972 Cambridge–Austin & Short–pages 17–31 and 93–101.
Production of Twins in Cattle by Egg Transfer, L. E. A. Rowson, et al.,–Journal of Reproduction and Fertility (1971) 25, pages 261–268.
Journal of Reproductive Fertility (1969) 18, pages 517–523, L. E. A. Rowson et al.–Fertility Following Egg Transfer in Cow.
Journal of Reproductive Fertility–Development of Eggs in Rabbit Oviduct–R. A. S. Lawson et al.–1972 (28) pages 313–315.

*Primary Examiner*—Aldrich F. Medbery

[57] ABSTRACT

Disclosed a process for making greater use of female gametes in herbivorous mannals. The techniques include methods of obtaining ova from donor, preparation of recipients, detection of oestrus, and transplant techniques. Also disclosed are methods of making greater desired use of ova of these mammals. Among those are techniques by sex determination, for freezing and thawing eggs, for tissue culture of eggs and for clonal production of like embroyos utilized for transplantation to achieve a greater number of clonal differentiated cellular bodies having like genetic characteristics.

100 Claims, No Drawings

REPRODUCTION PROCESSES FOR CELLULAR BODIES

In the late 1890's Walter Heape in Cambridge, England, carried out experiments relating to egg transfer in animals. This research has been continued by many experimenters.

L. E. A. Rowson and his associates at the A.R.C. Unit of Reproductive Physiology and Biochemistry, Animal Research Station, Cambridge, England, have recently developed techniques for ova transplantation in mammels, particularly in farm animals. The Veterinary Annual, 1969, Bristol, John Wright & Sons Ltd., has an article by L. E. A. Rowson, pp. 200, entitled "Reproduction and Reproductive Disorders", which sets forth their developments. Techniques relating to these developments are also described in Book 5 of the Reproduction in Mammals Series, "Artifical Control of Reproduction" by C. R. Austin and R. V. Short, published in Cambridge at the University Press, 1972, see chapters one and four; and, one may also refer to the X Biennial Symposium on Animal Reproduction, American Society of Animal Science, as well as Sex Ratio at Birth-Prospects for Control, a Symposium published by the American Society of Animal Science, 1971. More generally developments in this area are reported in Science (U.S.), Nature (U.K.), Journal of Animal Science, Journal of Reproduction and Fertility and in the journal, The Biology of Reproduction.

These techniques, as developed and described in the above references, employ exogenous gonadotrophins to induce superovulation in a donor, sometimes superceded by oestrus synchronization of the donor and the hopeful foster recipients, followed by artificial insemination of the donor, surgical collection of oocytes after fertilization, embryo culture for a short period of time in commercially available tissue culture medium, and finally transplantation to the uterus of a synchronized recipient of one or more embryos for maturation of the fetus. Rabbits have been shown to be suitable temporary "receptacles" for the embryo prior to recipient transplantation, which is presently preferred to be done surgically, and these receptacles have been used to transport sheep embryos from England to South Africa, resulting in subsequent birth from their foster mother.

According to Austin and Short, pp. 30, slices of a rats ovary, treated with glycerol have been frozen to −70°C., thawed and transplanted to recipients. Mice embryos have reportedly also survived freezing to −196°C., thawed, and transplanted to recipients, who gave birth to normal and full term living fetuses or new born mice, see Science (U.S.), Vol. 178, pp. 411, Oct. 27, 1972. These developments relate to the techniques, as well as other seperately known techniques which may be usefully employed to achieve the results described herein. For instance, it is well known that vasectomy may be performed to make teaser males as a method of detecting oestrus, as mounting is a reliable indication, which may be confirmed by a marking method as described in U.S. Pat. No. 3,076,431 of Feb. 5, 1963.

The techniques described herein are believed to represent an improved technique for increasing the reproductive potential of genetically superior cattle, as well as other form animals and mammals, when the methods, devices and compositions described are employed as indicated.

By employing the techniques described, it may be believed that egg transplantation will become a common practice, and that, contrary to the statement of C. Polge in the aforementioned "Artificial Control of Reproduction", it will not be long before the described techniques will be used in a similar way to artificial insemination in order to exploit the genetic potential of the female, the male as well. These techniques can also exploit the true uterine capacity of females, as sheep, cattle and, indeed women, "appear to be rather exceptional in that the frequency of 'large litters' resulting from treatment with exogenous gonadotrophins must indicate quite a phenomeal uterine capacity." (C. Polge, pp. 25).

While the foregoing techniques have been used in experimental techniques, they utilize techniques which are not readily reproducible in large numbers and suffer from other difficiencies which are overcome by the improvements disclosed herein.

While various modifications, combinations and rearrangement will occur to those skilled in the art, both now, and in the future without departing from the scope of the claims appended hereto, it will be appreciated that the improvements disclosed herein make use of available materials or of materials described herein.

Thus, included in the object of the present disclosure are processes to make proctable increased availability of desired genetic material.

Accordingly, disclosed herein are improved techniques in tissue culture of embryos, freezing techniques for oocytes, methods of predetermining the sex of the embroyo which is transplanted use and techniques for clonal bodies so that several embryos of like genetic material may be obtained from the same donor.

The synchronization of donor and recipient is made less critical than hithertofore, permitting greater time delay in transplantation time.

The many improvements which are described hereinafter will be described in particular hereinafter, and consequently the foregoing is not intended to limit the techniques to be described, not to be an all inclusive description of the improvements which follow.

Accordingly, a description of the preferred embodiments follows.

Oestrus can be determined by observation of mounting, which preferably, and most reliably, is done by a vasectomized or gomerized male animals. Such teaser bulls will mount cows at the start of oestrus. Vasectomized males with a portion of the vas deferens removed, or with the removal of the caudidymis, can copulate. By penis and prepuce deviation, copulation and the consequent transmission of disease may be prevented. Economics require that teaser bulls be rotated through lots of twenty to thirty cows monthly so as to obtain maximum usage while retaining reliability.

Mounting can be observed in close confinement or on the range by trained cowboys. However, a more reliable proof is obtained if the cow is marked by the mounting bull. Kamar, Inc. sells the device described in their aforementioned U.S. Pat. No. 3,076,431. Or the bull may be fitted with a marking halter designed for this purpose and supplied by American Breeders Service, DeForest, Wis.

A preferable means for marking is a topical application of pigmented grease or oil to that portion of the male which contacts the externally visable rump area of the female during mounting attempts. This may be applied to the brisket and underbelly of bulls.

The marks made upon the mounted female may be readily observed, permitting detection of oestrus even by the untrained. It is desireable that the formulation for the grease be harmless in topical applications and resistent to being washed off in the rain, but which can be removed with soapy water or detergents. A desirable vehicle is an oil in which a pigment is mixed. Different colors are desirable to employ, both with respect to providing a daily variation to the color markings.

Examples of desirable vehicles follow:

| Formulation | Parts/weight |
| --- | --- |
| Oleic acid or Olive Oil or Peanut Oil | 50% |
| Lecithin (soybean) | 1% |
| Caster Oil | 24% |
| Pigment, as follows: | 25% |
| Blue: Cobaltous chloride | |
| Black: Carbon Black | |
| Yellow: Calcium Chromate | |
| White: Precipitated Calcium Carbonate | |
| Redish: Vitriol red (Red Hematite) | |
| Red: Normal Red pigment | |

The above formulation meets the requirements and will prove quite satisfactory for topical applications as well as providing the desired color variations.

Preparation of teaser males can be accomplished by several techniques. Amounting to the greatest difficulty by the fact that it requires a skilled surgical technician is the surgical preparation of the male using penis and prepuce deviation, as described in Veterinary Medicine/Small Animal Clinician, Apr. 1973, page 395. Utilizing this method, copulation is prevented.

However, since one of the impostant aspects of this description is to provide a readily reproduceable technique, I prefer the technique of resection of the epididymis, especially in the bovine species. The operation is performed with the bull, shortly before puberty. The operation to be described has a consequent benefit in that the same techniques can be utilized in potential market animals. Bulls grow much more rapidly than steers, and a weight with less fat content 8% greater than that which can be obtained with steers is to be expected.

The operation is performed in the standing position. The epididymal tails are removed from small ventral scrotal incisions. Local or heavy epidural anesthesia is used. The testicles are forced to the bottom of the scrotum. An incision of 3cm to 5cm is made through the skin and tunic directly over the tail of the epididymis. Dorsal pressure on the testicle is used to force the tail of the epididymis through the incision. The ligamentum of the epididymis which attaches the tail of the epididymis to the testicle is severed with scissors and the tail of the epididymis is held in position by the ductus deferens and the body of the epididymis, both of which pass dorsally up the side of the testicle. Suture material is used to jointly ligate the body of the epididymis close to the testicle. The tail of the epididymis is severed with scissors and removed. The procedure is repeated for the testicle on the other side. Antibiotic powder is applied to the wound which is closed with sucures or clamps. Wait 20 days before using the bull.

The limited numbers of occurances of oestrus in a sample group can be increased by synchronization. This can be accomplished by synchronization. The suppression of oestrus by gonadotrophens, particularly progestrogens, is useful in this regard.

Medroxyprogesterone acetate, C-methyl-17 acetoxy progesterone, (MAP, Upjohn) is a synthetic progesterone which has been used in an ethanolic solution to suppress oestrus. Malengestrol Acetate (MGA) is marketed by the Tuco Division of The Upjohn Company, Kalamazoo, Mich. 49001, as a food additive available to holders of approved Medicated Food Applications, and is a synthetic progestrogen that is used to suppress oestrus in order to improve rate of gain and feed conversion for feedlot heifers. It is not approved for synchronization purposes. Presumeably, this is because MGA produces abortions (Journal of Animal Science, Vol. 30, pp. 433) and the fertilization rate of ova is low while ovarian abnormalitites is high (Abstract 155, Journal of Animal Science, Vol 35). MGA has been implanted in a polyurethane implant placed in a prominent ear vein or subcutaneously in the ear of heifers. Release rates of .4mg per day have been obtained.

MGA may be fed orally, daily, or incorporated in a grain diet (up to 4.0 miligrams in 1.82 kg of grain per day). I prefer to utilize .4 mg to 1.0 mg in 1.8 kg daily. The optimal amount may approximate .5 mg oral dosage daily. Oral dosages of .5 mg daily have been known to suppress oestrus and permit oestrus 2–9 days after withdrawal (Veterinary Medicine/Small Animal Clinician., Vol. 65, May 1970, pp. 491).

Using the preferred oral dosage in grain after withdrawal oestrus will occur 2–11 days after withdrawal with an average of 4.5 days (±.5 days) after withdrawal. Heifers and mature females after birth should have a normal oestrous cycle before medication.

In order to improve the rate of ova fertilization and expected oestrus, on the day of withdrawal 10–20, preferably 15–17 mg, of the steroid Estradiol Benzoate (Arapahoe Chemicals, Inc., Boulder, Colo.) is administered in an intra-muscular injection. This may be followed by a similar amount on the 5th day. The first amount may be reduced with a dosage of 15–17 mg on the 5th day proving satisfactory in most instances. The steroid may be introduced orally by mixture in ethanolic solution and then introduced in saline capsule form, or added to the grain ration.

While fertilization may occur during the first oestrus using the aforementioned technique in cattle it will be preferred to wait until the second period where conception rates may be improved.

Preferably animals are inseminated on day 26 or 27 and again on day 28 if precise control of detection of oestrus and ovulation described herein is not employed. After synchronization oestrus can readily be detected using teaser bulls. As mentioned above this causes the females to be marked at the start of oestrus.

As previously mentioned, many mammals have a uterine capacity which permits maturation of a greater number of fetuses than is normal in the species. This makes multiple births or twinning especially desireable. However, it is recognized that twinning be desireable, but too many embryos are undesireable. In cattle the preferred method of inducement of twinning is a dose level of 5–15mg. FSH, preferably 7.5mg to 10 mg in 3.6 ml of 1% Na carboxymethyl celluose (Abbott Laboratories, Chicago, Ill.) given commencing on day 14–16 of the estrous cycle intramuscularly twice daily for five days. Suppression of oestrus during this period may be desireable and accomplished as previously discusses with the synthetic progestrogens available from Upjohn as previously discussed (MAG). FSH-P available in 10cc vials of about 50mg FSH units can be obtained from Armour-Baldwin Laboratories, Omaha, Nebr. One-fifth of a vial provides a shitable dosage. FSH tends to overcome the tendency of PMS to produce the undesireable superovulation which may produce too many oocytes for maturation.

It is well recognized that twinning in cattle has disappointing side effects when different sexes are carried, as even one male of a litter will usually produce all female freemartins in the litter. Twinning has the result, however, of increasing the production of animals and the unhappy side affects can be overcome by using the sex control techniques later discussed.

Superovulation may be distinguished from the above twinning techniques, in that usually a greater number of ova are produced at ovulation.

Reproduction of selected individuals may be accomplished to utilize more fully the genetics of desireable females. The techniques of superovulation and transplantation of ova have been generally described. Certain improvements in these techniques and preferred steps will be fully described herein.

Suppression of oestrus is desireable in recipient mammals. The prior description may be referred to again. The cow or heifer that is to be superovulated should have a cycle synchronized with those of recipients, but because of fertility problems the ova should not be recovered until the second oestrus.

Multiple or super-ovulation may be induced by injection of 1500 to 3000 IU (international units) of PMS, pregnant mare serum. 2000 IU is preferred for cattle, while one half the amount used for large animals is suitable for swine and sheep. PMS (Ayerest Laboratories) serum may be injected on the 16th day of the oestrus cycle, or between day 15–18. A single PMS injection induces hyperfollicular development, even in calves 4–14 weeks of age. It should be followed by an intravenous injection of 5 to 10mg of NIH-LH leutinizing hormone 5 days after the PMS injection. LH may be obtained from Diamond Laboratories, DeMoines, Iowa (vetrophin), each vial should have 5mg of NIH-FSH-S4 and NIH-LH-S1 activity. Twelve to 24 hours later the ova produced should be exposed to semen if insemination is to be accomplished in the donor animal.

It has been mentioned that instead of PMS serum, pituitary gonadrophins (FSH) may be substituted to cause twinning. Since these are rapidly dissapated, between the 12th and 18th day of the oestrous cycle, injections of 6–14mg (the lower level will produce fewer follicles which develop) twice daily for approximately 5 days, are required, given either in the previously described preferred manner or intramuscularly in physiological saline. It has been suggested that Nilevar (norethandrolone-no longer manufactured by Searle) is useful to prevent oestrus during this period (Journal Animal Science, Vol. 34, 1972, pp. 77), but it is not desireable and a low level of MGA (.3–.5mg) can be used to accomplish this purpose and seems to increase the number of follicles. FSH-P (Armour-Baldwin) is a suitable pitutary gonadrophin, as previously mentioned. 10mg of prepared porcine FSH may be substituted. LH, eg. NIH-LH-S1 can be used to cause release at the end of the period.

After the onset of oestrus in cattle, they should be checked every 4 hours until the end of oestrus is detected and the ovaries should be rectally palpated at 4 hour intervals until ovulation is detected. Animals should be inseminated, if done internally of the donor, with semen uring the latter portion of oestrus.

The follicular development herein contemplated can be increased, especially when utilizing gonadotrophins by feeding a high energy content ration during the period of follicular development, 7–14 days after last oestrus.

This ration should double the weight of the normal grain ration, with the additional weight of the ration being provided by glucose, and other high energy sources as fat (lard) and mollasas.

At the start of this period, estradiol benzoate, in the dosage elsewhere described herein, is also desirable.

It is most desireable to obtain eggs from a superovulated female between 8 and 90 hours after ovulation. If the eggs have been internally inseminated, then the best period is between 50 and 80 hours, and preferably between 70 and 80 hours, at which time the eggs are mainly in the lower reaches of the oviduct before the ampullary-isthmic junction (a contraction before the uterus) and in the upper part of the uterine horn. This leads to a concentration of the oocytes in this local area.

This period is generally acceptable for non-inseminated subjects, but eggs will be found higher in the oviduct, even near the fimbriae. Here the best period is between 40 and 80 hours when most of the eggs have reached a point near the ampullary-isthmic junction.

In other animals, for example swine, the transport is even more rapid than the aforementioned conditions occurring in cattle.

Within the period flank laparotomy may be performed. The subjects should be taken off feed 24 hours before the surgery and each given an intramuscular injection of about 0.5ml of propiopromazine hydrochloride (e.g. Travet, Abbott Labs 50/mg. ml) 25 minutes before anesthesia. Anesthesia can be a procaine hydrochloride injection on both the dorsal and ventral sides of the first, third, and fifth lumbar vertebra, the amount being 100 to 150 ml depending on individual size.

The incision area is shaved and washed with aseptic solution. An incision can be made between the last rib and the external angle of the illium 15 to 20 cm in length. This can be done using a No. 22 Bard-Parker blade in a No. 4 Bard-Parker handle. Using an ecraseur a bilateral ovariectomy and salpingectomy is preformed.

Where an oviduct is disected the cervical end of the uterine horn is clamped and seared with a hot iron and the seared site punctured with a blunt needle of a 20–50 ml syringe containing sterile bovine blood serum (Difco, Detroit, Mich.) or prefereably, when the oviduct is removed, TCM199 or, more preferable, the medium described and given as an example herein for embryo culture. The horn is flushed with serum (which may require 20 to 40 ml serum) and the passings collected in a sterile cup watch glass, the flushings passing through the oviduct. The oviduct is accordingly inserted with a tube having a collecting surge chamber for collecting the released oocytes. Aspiration of the tubule will help this process.

Alternate anesthesia includes an initial injection of pentobarbitone sodium followed in 15 minutes with closed circuit Fluothane and oxygen. The incision can be made immediately anterior to the pelvis in the midline through which the uterus and ovaries are withdrawn clamping off the horn. A mid-oviduct incision is made through which the tubulation is inserted. A syringe of 40 ml. is introduced ahead of the clamp and the oviduct flushed in the foregoing manner. The uterus is then returned to the abdomen and the wound sutured using No. 3 catgut followed by interupted sutures of the skin covered with tape.

Fertilized eggs may be transferred to a foster recipient mother whose oestrus is synchronized with a variation of ±2 days.

Transplants use the same techniques as before, except that the ovary containing the corpus luteum is identified by rectal palpatation and the eggs are transferred to the adjacent uterine horn by using a Pasteur Pipette connected to a 1 ml syringe. If the corpus luteum is present on each ovary, eggs may be transplanted to both horns. However, unless this is present, twinning is not as likely. Provided that the eggs (blastomers) are sexed it is desireable to transplant two eggs to increase the likelihood of birth, but this may be done without too great fear of freemartins, since one birth for two oocytes is most likely.

Eggs may be kept if fertilized for a short period of time (10 hours) in a dialysis chamber, or incubation unit as later described for a longer period, or they may be transfered into the utero-tubal junction of a rabbits oviduct which is litigated so that the eggs do not pass into the uterus. This facilitates their recovery when the oviduct is flushed to recover the eggs. Under these conditions, the eggs will divide normally up to about 7 days, as is also possible in an incubator.

Care should be taken to be sure the recipient is synchronized to ±2 days, preferably exactly. It usually takes 4 days after fertilization before the eggs enter the uterus where they can be collected from the cervix entry procedures two be outlined. Also, we should remember that about the same time is used when the eggs are recovered surgically from the oviduct and uterus. Recipients should receive the eggs before regression of the corpus luteum, and preferably within the period ending on the 6th or 7th day.

Using a pipette, and techniques like those used for artificial insemination, the eggs can be inserted via the cervix in cattle and horses (not swine), but aseptic conditions should be used to prevent purulent endometritis. Distension of the uterus with carbon dioxide is desireable for non-surgical transfers.

Non-surgical introduction of eggs into recipients, 2 or 3 of 6 cell to early morula stage, is accomplished starting with drawing the eggs along with 0.5 ml medium or serum into an ordinary insemination pipette which is curved at one end, all under aseptic conditions. The pipette is introduced through a sterile speculum into the cervical canal of the recipient and passed forward along the uterine horn which has had the corpus luteum detected previously by rectal palpation. $CO_2$ is introduced via the same pipette until the uterus is fully distended. The equipment comprises two flasks, one containing dry ice pieces which are covered with ethanol and which flask is connected to the second flask beneath a water line (the second flask is half filled with distilled water). The upper space of the second flask is connected to a tee fitting, one side of which leads to the pipette and the other side to a rubber balloon which distends as pressure within the uterus increases. Immediately after gassing the pipette is withdrawn and the uterus should remain distended for 4 to 6 hours.

Transplantation by these non-surgical techniques contemplates the use of a flexible cannula made preferably of Silastic (TM of Dow Chemical) tubing in a pipette. The pipette is inserted into the uterine horn and the cannula is passed (through the pipette) to expel the transplant into the uterine horn, or with small size transplants, into the oviduct through the isthmic junction.

Before transfer of fertilized ova to the recipient it will be desireable to sex the embryo being transferred. This can be done in a variety of ways. Clearly, the fertilization of the oocyte with ordinary spermatazoa will result in a 50% count of one sex. Yet, since it is possible to maintain the embroyo in vitro for a period of time, as will be described, it is also possible to microscopically determine with an electron microscope whether the X or Y chromozone is present in cells of the embryo.

Cells of the morula stage or the blastocyst are excised from the embroyo. With the blastocyst, which is the more desireable in view of the lowest damage risk, the zona pellucida is held with a pipette under suction and the trophoblast penetrated with a needle large enough to excise one or two cells.

In order to examine cells for chromozone content, 0.075 KCl (Gibco No. R15-0575) is mixed to a total volume of 4 ml and refrigerated. The cells are suspended in .5 ml of fetal calf serum and 0.5ml of hypotonic solution added and followed with 3.5ml just before centrifugation. Centrifuge for 6 minutes at 750 rpm. The elapsed time from addition to termination should not exceed 12 minutes. Discard all but 0.25 ml of supernatant and re-suspend the cells in the remaining supernatant. Fix with three parts absolute alchol to one part of glacial acetic acid by first adding 0.5 ml and follow with 3.5 ml of fixative solution. The cells should stand in fixation solution 15 minutes. Discard all but 0.25 ml of fixative supernatant and repeat the fixation procedure.

After the fixation procedure has been repeated, remove all but 0.5 ml fixative solution and re-suspend the cells. Place two drops with the cells on a clean chilled wet glass slide and blow dry. Then stain with two drops of Aceto-Orcin stain (Gibco No. 537,538,539). Then examine the cells under an electron microscope and not the chromozone characteristics.

Slaughtered animals may be a source of oocytes which may be transferred to living recipients for maturation. Slaughtered animals are treated prior to slaughter as if normal surgical or non-surgical procedures are to be adopted. The time of slaughter should correspond to that outlined for surgical techniques. The animal may be slaughtered after fertilization or before insemination as in surgical recovery techniques.

Slaughter is accomplished by stunning the animal and bleeding. While bleeding is being accomplished, an incision is made ventrally and the ovaries, oviducts, and the uterine horns are recovered intact. The uterine horns are immediately clamped and seared. The organs are placed in a transfer incubator to maintain the organs at 30 to 38°C., preferably 31-33°C., and transferred to the point where the eggs are to be recovered.

The recovery is accomplished by severing the oviduct and the eggs are flushed from the oviduct by insertion of a syringe through the uterine horn and injecting 20–40 ml of serum or preferably tissue culture medium (TCM199 or Ham's F10 or F12, Gibco).

The eggs are deposited in a watch glass and covered with parafine oil. They are examined at 50X and collected and transferred to the preferred tissue culture medium described herein and subsequently to the recipient.

Unfertilized oocytes can also be recovered from the ovary by aspiration of the corpus luteum of the slaughtered animal. These may be fertilized as elsewhere described.

Between recovery and transfer to a recipient it is desireable to culture the embryo in tissue culture medium such as TCM199 or Ham's F10 and preferably the formulations described by way of examples herein. The culture is maintained in a commercial incubator for tissue cultures at temperatures ranging from 31°C. to 37°C. with 5% $CO_2$ and 95% air or oxygen. Lower temperatures in the range (31–33°C) are preferred. Some success will be had at the normal tissue culture range 37°c.

Culture chambers can be glass specimen tubes (30 by 100 mm or 25 by 75 mm) with silicone rubber stoppers. The inner surface of the tube should be coated with silicone to prevent attachment of the growth to the glass wall. Half of the tube is filled with culture medium buffered with HEPES buffer, and 20% bovine serum, and the other half with the gas mixture which is renewed every 8 hours. Tubes should be laid horizontally on rollers and continuously rotated at 30 to 40 revolutions per minute during incubation.

When the eggs are recovered, the flushings are collected into the tubes. About 3ml of fluid is removed at the bottom of each tube after 20 minutes at incubation temperatures and transferred to a watch glass or well slide and the ova is sought under a disecting microscope at 50X or 187.5X and examined at 450X or 1875X.

Eggs can then be transferred to the cecipients in the manner described, or to longer duration culture in tubes or rabbits.

The preferred culture medium, as shown in the following example includes Vitamin B12, Lipoicacid, Sodium pyruvate and L-Glutamine. It is buffered with HEPES buffer and $NaHCO_3$ to a pH of 7.3–7.4.

| PREFERRED EXAMPLE CULTURE MEDIUM | mg./Liter |
|---|---|
| NaCL | 6800. |
| Kcl | 400. |
| $MgSO_4 \cdot 7H_2O$ | 200. |
| $Na_2HPO_4 \cdot 2H_2O$ | 60. |
| $KH_2PO_4$ | 60. |
| Glucose | 1800. |
| Phenol red | 10. |
| CaCl (anhyd.) | 200. |
| $NaHCO_3$ (depending on pH) | 400. |
| L-Arginine HCl | 70.0 |
| L-Histidine HCl | 20.0 |
| L-Lysine monohydrochloride | 70.0 |
| DL-Tryptophan | 20.0 |
| DL-Phenylalanine | 50.0 |

-Continued

| PREFERRED EXAMPLE CULTURE MEDIUM | mg./Liter |
|---|---|
| DL-Methionine | 30.0 |
| DL-Serine | 50.0 |
| DL-Threonine | 60.0 |
| DL-Leucine | 120.0 |
| DL-Isoleucine | 40.0 |
| DL-Valine | 50.0 |
| DL-Glutamic acid monohydrate | 150.0 |
| DL-Aspartic acid | 60.0 |
| DL-Alpha-Alanine | 50.0 |
| L-Proline | 40.0 |
| L-Hydroxyproline | 10.0 |
| Glycine | 50.0 |
| L-Glutamine | 100.0 |
| Sodium acetate | 50.0 |
| L-Cystine | 20.0 |
| L-Tyrosine | 40.0 |
| L-Cysteine HCl | 0.1 |
| Adenine Sulfate | 10.0 |
| Guanine HCl | 0.3 |
| Xanthine | 0.3 |
| Hypoxanthine | 0.3 |
| Uracil | 0.3 |
| Thymine | 0.3 |
| Disodium alpha tocopherol phosphate | 0.01 |
| Thiamine HCl | 0.01 |
| Pyridoxine HCl | 0.025 |
| Riboflavin | 0.010 |
| Pyridoxal HCl | 0.025 |
| Niacin | 0.025 |
| Ca pantothenate | 0.010 |
| i-Inositol | 0.050 |
| Ascorbic acid | 0.050 |
| Folic acid | 0.010 |
| Para-Aminobenzoic acid | 0.050 |
| Feric nitrate $Fe(NO_3)_3$ | 0.100 |
| d-Biotin | 0.010 |
| Menadione | 0.010 |
| Glutathione | 0.050 |
| Vitamin A | 0.100 |
| Calciferol | 0.200 |
| Tween 80 (Trademark Atlas Powder) | 20.0 |
| Adenylic acid | 0.200 |
| Adenosinetriphosphate | 1.0 |
| Desoxyribose | 0.5 |
| Ribose | 0.5 |
| Choline Cl | 0.5 |
| Vitamin $B_{12}$ | 1.3 |
| Lipoic acid | 0.2 |
| Sodium pyruvate | 110.0 |
| L-Glutamine | 200.0 |

Plus 20% fetal calf serum, heat inactivated, per liter of above example.

EXAMPLE 2

Same as above but Earle's salts (Gibco) are substituted for the salts of the first example while Glucose is still 1800 mg/L.

EXAMPLE 3

Same as example two with twice the vitamins and amino acids by weight.

EXAMPLE 4

Same as first example with twice the vitamins and amino acids by weight and with Glucose at 1000.0 mg/L.

Oocytes may be removed from the corpus luteum and matured in vitro. A number 20 needle is attached to a 100 ml syringe filled with 20 ml of culture medium. The corpus luteum is identified by laparoscopy performed 32–36 hours after gonadotrophin injection to cause follicular development or in the first 24 hours of heat or oestrus in cattle, preferably before 14 hours have elapsed after detection.

A 15–20 cm incision is made as described for surgical recovery of ova or mid-ventrally above the udder in cattle. The abdominal cavity is distended with $CO_2$ and a labroscope inserted to locate the ovaries and the corpus luteum. The corpus luteum is penetrated with the needle and the oocyte aspirated under steady vacuum.

The oocyte is transferred to a watch glass having 5 ml of medium covered with parafin or mineral oil. Cumulus cells surrounding the oocyte are removed with exposure to hyaluronidase for 3 to 5 minutes. The oocyte is removed with a pipette and 0.1 ml of medium and washed twice with 2 ml of medium. Care should be used to be sure that the oocytes are always covered with medium or PBS medium (Dulbecco's phosphate buffered salt solution) to prevent dehydration.

Oocytes aspirated from the folicule will mature in vitro when the follicular development has been initiated by gonadotrophin injections as used in causing superovulation and the oocytes are removed from the walls of thinned (developed) follicules.

Oocytes will mature when recovered from the corpus luteum of mature follicules in about 4 hours, as the cumulus cells are separated. There usually is no need to separate the cumulus oophorus.

Oocytes may be obtained by slaughter 6 to 14 hours after oestrus detection. The oviducts are separated into ⅛ sections and the unopened corpus luteum should be aspirated as well. The sections and the aspirated corpus luteum oocytes should be placed in medium covered with parafin oil or mineral oil.

Whenever the oocytes are recovered they should be kept warm in an incubator or on a warm stage of a disecting microscope. The parafin oil should be equilibrated with 5% $CO_2$ in air in the culture medium.

If necessary the cumulus cell clot should be withdrawn.

Care should be observed to retain an amount of fresh follicular fluid as 0.1 ml of follicular fluid is introduced with 0.4 ml of sperm having a concentration of one to two million per ml. Within 2 to 4 hours the cumulus cells surrounding the oocytes separate and form a layer on the surface. By 5 to 7 hours in concentration the fertilization is complete and the eggs can be placed in culture for maturation to the morula stage or transferred to a recipient.

The fertilization in vitro utilizes the examples of formulation of the culture medium buffered to pH7.3–7.5 with Sodium Bicarbonate and dilute HCl. Sodium pyruvate or sodium oxaloacetate should be part of this fertilization medium and bovine albumen at 30% by volume utilized. The medium for fertilization and culture should contain 50 milligrams of streptomycin sulfate/ml and 75mg penicillin G(potassium salt) /ml should also be added. These however should be used when sperm seperation by sex is used.

Synchronization of the donor and recipient as to ovulation time can be overcome by employing improved techniques.

A delay can be achieved by culture of the transplanted cellular bodies for a period of time.

This can be accomplished by the freezing techniques described herein, or by moving back the development of the donor cell by separation of the cell so that the total number of differentiated cells which are transplanted are at the stage that they would be had normal progress been permitted.

Thus, it is preferred to transplant cellular bodies to recipients at the time corresponding to a few days from the time of division of the first cell or the cellular bodies and the time of normal fertilization of the recipient. The object is to provide the donor cell to the recipient at a time approximately that which permits implantation at the blastocyst stage of development.

This is preferably 12 days of synchronization of the expected blastocyst or morula stage of the embroyo and the date the receipient would expect its own blastocyst or morula stage.

Such timing permits greater use of non-surgical transplantation, as well as surgical transplants at a later time, and should be done before the 10th day after receipient ovulation, preferably before the 7th day after ovulation.

The cell separation techniques and freezing techniques used to accomplish this result are disclosed elsewhere herein.

Sex determination is important for many reasons and can be accomplished by sexing an embryo after fertilization or in other ways as described herein.

Spermatazoa may be presexed by seperation of the X and Y chromozone bearing spermatazoa, and the resultant seperation utilized to fertilize matured oocytes.

One method of accomplishing seperation is by centrifugation of closed pipettes containing semen at 750 rpm several times. The "female" sperm will weight slightly more and they tend to be concentrated at the lower portion of the tube. Spermatozoans should be suspended in a thin buffered solution during centrifugation. Electrophorisis has been used to separate spermatozoa. Neither of these techniques are particularly satisfactory in the current state of the art.

However, an improved technique using ion exchange materials may be employed as described herein. It is recognized that spermatozoa have a net negative charge, but there appears to be a localization of the charge on either the head or tail of the spermatozoom. Better results appear possible to yield the desired female spermatozoa using ion exchange materials, alone or in combination with centrifugation.

Cations are used to produce entrapment of male sperm, and anions used to entrap female spermatozoa. This can be done by inducing floculation of the undesired sperm in a watch glass having high surface area to volume, the preferred method being described below.

While it is recognized that greensands and zeolites can be used as the ion exchange materials, the more satisfactory are finely divided ion exchange resins. Cation resins of the carboxylic divinyl benzene copolymers or the products of copolymerization of methacylic acid with divinyl benzene and those of maleic anhydride with styrene and divinyl benzene prove suitable. Streptomycin is not used in the support medium with carboxylic resins due to its ion exchange with them. These cation resins will yield spermatazoa capable of producing female offspring.

Anionic exchangers can be produced by nitration and subsequent reduction of styrene divinyl benzene copolymers. These will yield spermatazoa capable of producing males.

The resultant resins have the following structures:

Base Anion Exhange Resin

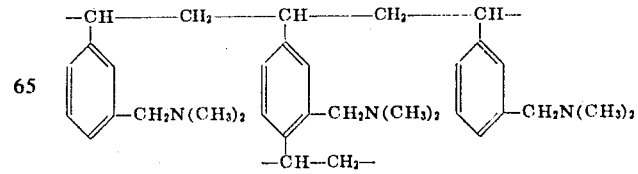

Acid Cation Exhange Resin

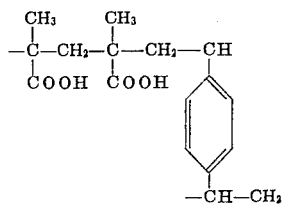

The resins which are used can be based on Dowex Resins (Trademark Dow Chemical Company, Midland, Mich.). The more strongly basic anion resins of the styrene-divinylbenzene type, Dowex 1,2,21K, can be used, but the polystyrene polyamine Dowex 3 which is weakly bacic can be better used in medium with a pH range up to 7.1–7.3. Mesh size 100 or greater (100–300) is preferred. Suitable resins are B342-AG3, B343-AG3 (both polystyrene polyamines) and B143-AG1, B144-AG1 (polystyrene guaternary amonium) as anions and B544-AG50, B545-AG50 (based on Dowex 50) as cations may be used and obtained from Bio-Rad Laboratories, Richmond, Calif.

Anion and Cation type resins may be of the cellulose type, with the cation type being preferable. A 100 to 200 mesh exchanger of Type 20 CM-cellulose (carboxymethyl cellulose) from Brown Company, 555 Fifth Ave., New York, N.Y., can be used.

To obtain the sample, the semen is washed twice and supported in a buffer solution with pH 7.3–7.5. The resin is introduced into a test tube with a funnel lower end and an enlarged lip, which test tube is in turn supported within a collecting test tube. The sperm is introduced above the resin and caused to percolate through the resin, preferably by centrifugation at 750 rpm for 1 minute or longer. The base of the outer collecting tube has additional buffer support solution to collect the seperated sperm.

The sperm is then stratified, and the desired spermatazoa removed and used for insemination or frozen.

Another technique contemplated to be used alone or in combination with the aforementioned ion exchange materials for seperation of serm fractions is a combination of centrifugation and pressure differentials.

This technique is especially effective with cattle due to the great difference in size of the X and Y spermatazoa. A conical tube separation chamber of a counter-streaming centrifuge is used. The desired female fraction is obtained by placing washed and dilluted semen in the centrifuge, alone, or in combination with the appropriate ion exchanger, and the dilluent sollution centrifuged at 750 r.p.m., at a speed lower than 1000 rep.m.. Here is a second, or third, force applied, namely, the application of a pressure differential of 15–30 cm from than at which the sperm was obtained.

For male sellection the above techniques are applied, and the speed is raised to be greater than 1000 r.p.m. and less than 1200 r.p.m. A vacuum in the order of 15–30 cm is applied as a differential compared to that of sperm recovery pressure.

The fractions are thus obtained and withdrawn from the dillutent and concentrated. They may then be used for insemination or forzen in a buffer sollution for later use.

The preferred embodiment utilizes counter-streaming centrifugation in combination with an ion exchange material. While the pressure differential appears to improve results, satisfactory fractions may be obtained as otherwise described. Such fractions are used to inseminate recovered ova.

Sex can be determined by examination of the cells removed from an embryo. At the blastocyst stage, the embroyo is placed in a chamber on the heated stage of a disecting microscope of the phase contrast type. The zona pellicuda is held with a micropipette, under slight vacuum. The cells are removed by placing a second micropipette against the zona pellicuda with slight pressure in the trophoblast region, and a capillary needle is inserted into the cells and a few cells are withdrawn from the trophoblast. These can be then examined with an electron microscope to determine sex.

When sex has been determined the blastocyst can be transferred to a recipient and allowed to mature.

Cells of the embryo can have several different operations performed which aid in the reproduction of genetically superior animals and make possible like sexes to be carried by the recipients. This make possible utilizing more fully the uterine capacity of cattle, by avoiding freemartins, and is applicable to other species.

Fertilized ova and small embryo, preferably no greater in size than the morula stage may be frozen to $-196°C$. This is accomplished by washing the embryo in 2 ml of medium, as described herein by example, or with PBS solution. Ova recovered from the corpus luteum should have extraneous cumulus cells of the graphian follicule removed by exposing them to hyaluronidose (150 U.S. pharmacopeia units per milliter) in the medium for 3 to 5 minutes.

In a very small drop (approximately .01 ml) medium, the eggs are transferred to pipettes containing 0.1 ml of medium. The cooling is done in a bath at a rate less than $2°C$. per minute with the optimum between 0.3 and $0.4°C$. per minute. At $0°C$., 0.1 ml of 2 M dimethyl sulfoxide is added as a buffer. After 15 or more minutes the samples are transferred to a bath of approximately $-4°C$. and seeded two minutes later with a minute ice crystal. Samples are then cooled at the same rate to $-70°C$. and then to $\times 110°C$ (ethanol and dry ice bath) and then transferred directly to liquid nitrogen ($-196°C$.). Liquid helium can be used to cause the temperature gradient and rate of cooling.

Thawing is done by placing the pipette in a tube 40 $\times$ 200 mm in $-110°C$. ethanol and warmed by contact with room temperature air at $4°$ per minute, measured starting $-65°C$. At $0°C$. then 0.2, then another 0.2 and finally 0.4 ml of culture medium is added. The embroyos are then transferred to 1 ml of medium and rinsed twice with a like amount. They are examined at 50X to determine the recovery rate and transferred to culture, eg to a watch glass under mineral oil at $30-38°C$. (Preferably $31-33°C$.) in a 5% $CO_2$ and oxygen or air atmosphere.

The cellular bodies which are thus frozen should be frozen in the preferred medium herein containing sodium pyruvate or sodium oxaloacetate in equal amounts. PBS solution containing these substances may also be used, and the addition of glucose is also desireable.

It is important to increase the utilization of recovered ova and to freeze in the same container embryo of the same sex.

To this end it is desireable to separate individual cells of one ovum with a lysin, as described herein, and to place cells of like character in the same container.

The lysin seperated cells are fully capable of differentiation after thawing and improved results are obtained in the freezing process.

The zona pellicuda of the morula stage or lower embroyonic cellular body, including those which are seperated by lysin treatment, may be desireabley removed before freezing.

After thawing the cellular bodies may be protected by transfer to the zona pellicuda of a second cell.

These procedures are described in more detail elsewhere.

Oospheres may be frozen in the foregoing manner and thawed to 0°C. and successive drops of sperm, preferably with follicular fluid, as later described, mixed with the support medium until the amount of fluid support medium is approximately .8 ml to 1 ml and the medium is allowed to warm by exposure to air temperature for 3 hours. For a more detailed description of in vitro fertilization reference may be had to the example given without reference to freezing elsewhere.

The operations on cells, morulas and blastocysts are performed with the aid of a phase contrast disecting microscope. The cell support employed is a small cup shaped watch glass which has been covered and has access aperatures of small side in the sides through which the operating tools may be inserted. These holes and the coverplate are sealed with silicone oil film, and the tools may be held with micropositioners and inserted through the oil film. The microscope stage should be heated.

Microneedles may be made from 1 mm Pyrex (Trademark of Corning Glass) or borosilica glass rod drawn out to form a thin shaft (about 0.3 mm) 50 mm long. A vertical bend is made to provide clearance between the microtool holder and the stage of the microscope. The thinner shaft is hooked to carry a weight, and then the hooked shaft is loaded with a 1 g. load and drawn out at an angle of 45°. The tip is formed with a bead which is then wiped off, or for a hooked needle the tip is cooled slightly and then bent at an angle of approximately 120° so as to form a hooked needle with an included angle of about 60°.

Micropipettes are made like needles starting with 1 mm glass capillaries. Between drawing operations the pipette is hooked, and finally the pipette is also drawn to a very thin portion with a 250 mg load at a 45° angle. The orifice is formed at the surface to form a bevelled bead orifice. Commercial micropositioners (Leitz) may be used to hold the tools with operations being performed within the cells with the tools thus prepared being held with the micropositioners.

At the two cell stage before division the cells should be closely observed to watch for division to the four cell stage. At the four cell stage, the upper and lower quadrants of the same hemisphere of the four cell stage can be microsurgically seperated by mechanically passing a glass microneedle through the zona pellicuda (if it has not been previously removed with lysins) and then with slow steady pressure separating the two hemispheres. This procedure may be used to produce identical twins.

Cloning of a fertilized ova is possible. The technique to be utilized herein is to remove the zona pellicuda at the morula stage of development or at the 8 to 16 cell stage by trypsination. The cells are suspended in the broth and exposed to the trypsin solution and after 15 minutes mechanically agitated with a glass microneedle to seperate individual cells. The cells are washed quickly with phosphate buffered medium.

Concurrently therewith it is desireable to have additional donee ova available with the zona pellicuda intact. With a sterile needle under the microscope the individual donee cells ahve their necleus removed or destroyed. The donor cells are aspirated into a needle attached to a syringe and the cell is injected into the nuclear region of the donee cells, and subsequently, these donee cells are transferred to culture or to the cecipient for maturation. Normally the cells are observed through the first division after the injection before transfer.

The zona pellucida can be removed by trypsin and the cells disassociated by trypsination or other lysin.

Cells may be suspended in the preferred medium or in Eagle's basic medium, both modified to have twice the usual amount of amino acids and vitamins (80 parts/volume), typtose phosphate broth (10 parts/volume) and bovine albumen serum (10 parts/volume) in a 112 ml flat petri dish having 20 ml medium under parafin or mineral oil. Then 0.5% solution of sodium edetate in a 1% solution of trypsin is added to the medium. The cells should be incubated for 15–30 minutes until the zona pellicuda is removed.

Dissociation of the cells after the zona pellicuda is removed may be accomplished by a 0.1% trypsin crystallized once (Worthington Biochemical Corp., Freehold, N.J.) in PBS solution (phosphate buffered saline with Eagles salts) and after 15–30 minutes gently pipetted. You can use 0.01 ml of PBS with .005 of trypsin solution. Detachment can be aided by stirring or other mechanical help, as by insertion of a fine needle into the cell mass and agitating.

After detachment with trypsin or other lysin, a sterile syringe is filled with about 0.1 ml of medium and the cells removed and washed twice with clean solution to remove the trypsin. One or more of the cells can be sexed with the help of an electron microscope.

If it is desired to chance repeating the above type of cloning, the cells must be permitted to grow again to the morula stage in culture, the cells being placed in 2–4 ml culture medium in a 32 mm plastic tissue culture petri dish, and placed in a larger dish containing 1.0 ml of PBS solution and tightly sealed in plastic bags to grow to a larger size.

However, it should be understood that each repeat process greatly increases the likelihood that incomplete embryos will develop.

It is possible to have development of the seperated cells without the zona pellicuda, but the zona pellicuda acts as a natural protection within the reecipient and survival to maturation is thus more easily obtained. As previously stated, this is accomplished by transfer of the donor cell to a donee cell. This is accomplished by aspirating the cell and injecting it into a donee cell which has its zona pellicuda intact and its nucleus destroyed. This is accomplished in various manners, these being described below.

An oocyte is held with a pipette under a disecting microscope. The zona pellicuda is pennetrated with a hooked needle and the neclues is pulled out of the cell or destroyed with agitation. Then into this region the donor cell is implanted. The necleus can also be by causing extrustion of the chromozones from the cell if a cell is capapable of division. During metaphase a small drop of silicone oil is placed adjacent the cell, and the cell will extrude the chromozones into the oil where they can be removed. However the mechanical removal of the nuclear protoplasm is preferred, and the use of dividing cells in interphase or the oocyte can be used. It is also possible to withdraw the necleus with a capillary needle by aspiration. By using fine needles the cell deformation caused by thicker needles is avoided.

Another technique for transfer of cellular bodies from one embryo is to remove the cell from the zona pellucida by lysin application or surgically. Thereafter the removed cell or cells are transplanted to a new zona pellicuda and allowed to develop therein. The nucleus of the original cell can be destroyed by ennucleation, destruction of the necleus, as is preferred, or by excision.

These techniques or combinations thereof can be employed to delay the time of necessary transplant and to achieve more clonal bodies.

The transplated cells can be transplanted in their entirety, or only the necleus and surrounding cytoplasm can be transplanted to the new cell body. If the latter is used, it is necessary to enneculeate the recipient cell and to transfer the necleus and surrounding cytoplasm into the cytoplasm of the foster cell.

While the above described technique is simple and expedient, it is also contemplated that alternative techniques can be employed. The donor cell zona pellicuda can remain intact and cells removed from the blastomere or morula and transferred in the foregoing manner to a donee cell. The cells may be extracted as complete cells and good results may be obtained. However, it is also possible to extract the necleus itself and transfer this necleus to the donee cell. The timing of this last technique is more critical, as both the necleus and the donee cell has a tendency to disintegrate, and the transfer must be accomplished by conducting both operations in parallel or in a short time.

These techniques produce identical "twins" which are not of the same genetic material as the father or mother, containing genes from both, as the genetic characteristics are determined by fertilization before separation of the embryonic cells.

Female offspring having the same genetic material as the mother animal may be especially desireable.

New individuals have already been created in the lower animals without fertilization by spermatazoa. Turkey eggs have been "fertilized" with viruses, to produce male turkeys.

According to two techniques described hereinbelow utilization of the chromozone content of the female alone is contemplated.

Two oocytes are employed. Each oocyte is a secondary oocyte which has elinated a single polar body and reached the mitotic metaphase of the second maturation division, as it is at the time of ovulation.

Both the polar body and the pronucleus are haploid. The two oocytes are placed in a closed disecting chamber on the heated stage of a phase contrast disecting microscope. Pressure within the chamber is carefully monitored. The support medium should be fortified with glucose and in the proportion by weight described in Example I. The support medium may be the same used for trypsinization, with an equal amount of hyaluronidaze and trypzin added. The donee cell is punctured and the vitelline membrane closely observed for the formation of cortical granules. Within 5-10 minutes the pronucleus of the trypsinized second oocyte has its necessary development and it is removed and injected into the first donee oocyte. Then equal amounts of Androgamone III, a fatty acid, and sodium dodecyl sulfate and bee venom is added to the support medium. From the equal percentage by weight of trypsin, hyaluronidase and the Androgamone III, sodium dodecyl sulfate and bee venom, a pseudo fertilization of the donee cell is obtained to some extent.

As a substitute a washed, dense, suspension of spermatazoa may made in the trypsin solution and centrifuged at high speed. The supernatant will contain an extract which is substituted to the same amount by weight as the fatty acids and detergents at the same point of time in the process.

The polar body may be substituted for the pronecleus of the second oocyte in a second embodiment.

When metaphase is observed, the result of the joining of the two haploid bodies have fused to form the diploid zygote and the sex of the embroyo is determined by chromozones obtained solely from the mother animal.

When the cell has been observed to have the violent reaction characteristic of fertilization the diploid zygote is removed, washed and transferred to culture medium.

Thereafter the cell is watched to determine whether normal division occurs and thereafter it may be handled as if the cell is a result of normal fertilzation.

I claim:

1. A process for embyro transplantation for increasing the number of progeny of female omnivorous and herbivorous hoofed mammal donors comprising,
   inducing superovulation in a desired donor by administration of gonadotrophin,
   receiving the ova from the donor,
   placing the recovered ova in tirrus culture medium and storing the recovered ova for a period of time,
   preparing recipients of prospective transplantations and determining the time of ovulation in the recipients,
   selecting one or more of the individual ovum or cellular bodies from said stored ova in said culture medium,
   transplanting selected individual ovum or cellular bodies derived from said donor to a selected recipient at a time corresponding to a synchronization of the individual ovum or cellular bodies transplanted and the time of normal fertilization of the recipient such that the transplant is synchronized at the blastocyst stage in the recipient at the time the recipient would normally implant a blastocyst had the recipient been fertilized.

2. A process according to claim 1 wherein the ova are frozen with tissue culture medium before transplantation.

3. A process according to claim 1 wherein the ova recovered from the donor have cells seperated from individual ovum and the development to the blastocyst stage is thus delayed.

4. A process according to claim 1 wherein transplantation is to the uterine horn of the recipient.

5. A process according to claim 1 wherein transplantation is to the oviduct of the recipient.

6. A process according to claim 1 wherein transplantation is to the oviduct of the recipient via the uterine horn and via a cannula inserted through the isthmic junction.

7. A process according to claim 1 wherein the ovum is permitted differentiation into a plurality of cellular bodies no further developed than the blastocyst stage, and one or more differentiated cells are recovered for microscopic examination to determine sex.

8. A process according to claim 1 wherein the ova donor is administered luteinizing hormone 4 to 6 days after gonodotrophin administration.

9. A process according to claim 1 wherein the donor is fed a high energy ration during the period of follicular development.

10. A process according to claim 1 wherein before transplantation cellular bodies of the donor are inserted within the zona pellicuda of a foster embroyonic cell.

11. A process according to claim 1 wherein before transplant to a recipient the developing cellular bodies are cultured at a temperature between 30°C. and 38°C.

12. A process according to claim 1 wherein the cellular bodies are cultured in a medium contain saline solution, glucose, amino acids and vitamins and sodium pyruvate.

13. A process according to claim 1 wherein the life support medium is in accordance with the preferred examples herein.

14. A process according to claim 1 wherein the cellular bodies are frozen and thawed before transplantation.

15. The differentiated cellular body derived by the process according to claim 1.

16. A method of increasing the number of progeny of female herbivorous and omivorous hoofed mammal donors comprising,
inducing superovulation in a desired donor by administration of gonadotrophin to obtain a plurality of ova at ovulation,
recovering the ova from the donor,
selecting an ovum from said recovered ova and dividing said ovum into a plurality of separate embryonic cells such that each is divided into a plurality of separate embryonic cellular bodies derived from said one selected ovum of the ova which have been recovered,
and transplanting one or more of the said cellular bodies derived from said one selected ovum to a recipient foster female for maturation.

17. A method according to claim 16 wherein the ova of the donor are fertilized with a spermatazoa fraction of which the greater number will produce zygotes of a desired sex.

18. A method according to claim 16 wherein the cellular bodies are sexed before transplantation to a recipient, the recipient receiving only transplants of like sex.

19. A process according to claim 1 wherein the ova are recovered after slaughter of the donor.

20. A process according to claim 16 wherein the removed ova are fertilized in vitro.

21. A process according to claim 1 wherein the transplantation is accomplished without surgery.

22. The differentiated cellular body derived by the method of claim 16.

23. A process for embryo transplantation for increasing the number of progeny of female omnivorous and herbivorous hoofed mammal donors comprising,
storing ova recovered from a donor in tissue culture medium as individual ovum cells or cellular bodies for a period of time,
preparing one or more recipients of a prospective transplantation and determining the time of ovulation in a selected recipient,
selecting a stored ovum or cellular body from said storage tissue culture medium, and,
transplanting said selected ovum or cellular body derived from said donor to said selected recipient at a time corresponding to a synchronization of the individual ovum or cellular body transplanted and the time of normal fertilization of the recipient such that the transplant is synchronized at the blastocyst stage in the recipient at the time the recipient would normally implant a blastocyst of its own had the recipient been fertilized.

24. A process according to claim 23 wherein the ova are frozen with tissue culture medium before transplantation.

25. A process according to claim 23 wherein the ova recovered from the donor have cells separated from individual recovered ovum as embryonic cellular bodies and the development of each thus separated cellular body has its development to the blastocyst stage thus delayed, and subsequently one or more of the separated cellular bodies are transplanted to a selected recipient.

26. A process according to claim 23 wherein transplantation to the recipient occurs after the recovered ova have been stored for a period of time exceeding a plurality of days.

27. A process according to claim 23 wherein transplantation to the recipient is delayed for a period of time exceeding that time during which the donor would have normally transported its ova through its oviduct and into its uterine horn.

28. A process according to claim 23 wherein transplantation is to the uterine horn of the recipient.

29. A process according to claim 23 wherein transplantation is to the oviduct of the recipient.

30. A process according to claim 29 wherein transplantation is to the oviduct of the recipient via the uterine horn and via a cannula inserted through the isthmic junction.

31. A process according to claim 23 wherein the ovum is permitted division into a plurality of cellular bodies no further developed than the blastocyst stage, and one or more differentiated cells from a cellular body to be transplanted or from a cellular body derived from one which is to be transplanted are examined with a microscope to determine sex of the transplant.

32. A process according to claim 23 wherein the ova are recovered from a donor which has been administered luteinizing hormone 4 to 6 days after a gonodotrophin administration to cause superovulation.

33. A process according to claim 23 wherein the ova are recovered from a donor which has been fed a high energy ration during the period of follicular development.

34. A process according to claim 23 wherein before transplantation one or more of cellular bodies seperated from a single recovered ovum of the donor are inserted within the zona pellicuda of a foster embryonic cell.

35. A process according to claim 34 wherein the separated cellular bodies are separated from other cells of the same ovum by exposure to a lysin solution.

36. A process according to claim 23 wherein the period of time for storage of the recovered ovum is greated than 2 days.

37. A process according to claim 23 wherein the storage temperature of the tissue culture medium is between 30°C. and 38°C.

38. A process according to claim 23 wherein the individual ovum or cellular bodies are stored and cultured in a medium containing saline solution, glucose, amino acids and vitamins and sodium pyruvate.

39. A process according to claim 23 wherein the lift support tissue culture medium is in accordance with the preferred examples herein.

40. A process according to claim 23 wherein said recovered ova are obtained by inducing superovulation in a desired donor by administration of gonadotrophin to said donor, and subsequently after ovulation the ova are recovered from said donor.

41. A process according to claim 23 wherein the ova of the donor are fertilized with a spermatazoa fraction of which the greater number will produce zygotes of a desired sex.

42. A process according to claim 23 wherein the transplanted cellular bodies or ovum are sexed before transplantation to a recipient, the recipient receiving only individual ovum or cellular bodies of a selected sex and of the same sex.

43. A process according to claim 23 wherein the recovered ova are recovered after slaughter of the donor.

44. A process according to claim 23 wherein the recovered ova are fertilized in vitro.

45. A process according to claim 23 wherein the transplantation is accomplished without surgery.

46. A process according to claim 23 wherein the individual ovum or cellular bodies are a clonal genotype, each embryonic cell having all its chromozones derived from the same individual.

47. A process according to claim 23 wherein the transplanted ovum or cellular body has all chromozones derived from the donor by inducing development of an oocyte recovered from the donor such that the oocyte is formed from a diploid nucleus derived from two genomes of the donor.

48. A process according to claim 23 wherein the donor of the recovered ova has been administered a high energy ration during the period of follicular development and during the period of follicular development pituitary gonadotrophin has been administered, and subsequently said ova have been recovered.

49. The differentiated cellular body derived by the process according to claim 23.

50. A process according to claim 23 wherein one or more recipients are prepared for a prospective transplantation by
  suppression of oestrus in said recipients by administration of progesterone to said recipients for a period of time,
  withdrawing the progesterone,
  subsequently administering gonadotrophin to enhance follicular development in said recipients,
  administering luteinizing hormone to the prospective recipients 4 to 6 days after the administration of gonadotrophin, and subsequently,
  performing said transplantation to said recipient 12 to 48 hours after administration of said luteinizing hormone or the detection of oestrus corresponding to the time of normal fertilization of the recipient.

51. A process according to claim 23 wherein the preparation of recipients includes the suppression of oestrus in said recipients and then ceasing said suppression of oestrus while currently therewith or thereafter administering estradiol to said recipient.

52. A process according to claim 23 wherein estradiol benzoate is administered to said recipients prior to performing the step of transplantation.

53. A process according to claim 23 wherein C-methyl-17 acetoxy progesterone is administered to a plurality of prospective recipients to suppress oestrus and permit synchronization of recipients and their period of ovulation with the time of desired transplantation.

54. A process according to claim 23 wherein during the period of preparation of the prospective recipients oestrus is suppressed for a period of time by the administration of progesterone as an oral dosage of .4 mg. to 1.0 mg. daily during said suppression period.

55. A process according to claim 23 wherein the preparation of prospective recipients includes the suppression of oestrus for a period of time and thereafter oestrus is permitted to occur and after said last oestrus period on the 14th to 20th day the prospective recipient is administered gonadotrophin.

56. A process according to claim 41 wherein the spermatazoa fraction is produced by a process which includes,
  washing sperm recovered from a male donor and transferring the spermatazoa to a dilute fluid support solution;
  percolating the spermatazoa through an ion exchange material; and
  concentrating the product and transferring the concentrated product to a buffered solution.

57. A process according to claim 41 wherein the spermatazoa fraction is obtained by percolating the spermatazoa through a cation exchange resin.

58. A process according to claim 41 wherein the spermatazoa is centrifuged through an ion exchange resin and fractioned by separating and utilizing the lower fraction which has been separated in the centrifugation step.

59. A process according to claim 41 wherein the spermatazoa fraction is obtained by percolating the spermatazoa through an ion exchange material of the cation type and the resin is of the group consisting of:

carboxylic divinyl benzene copolymers;
products of copolymerication of methacylic acid with divinyl benzene; and,
products of maleic anhydride with styrene and divinyl benzene.

60. A process according to claim 41 wherein the spermatazoa fraction is obtained by percolating spermatazoa through an ion exchange resin having the structure:

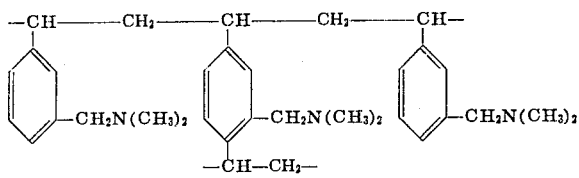

61. A process according to claim 41 wherein the spermatazoa fraction is obtained by percolating spermatazoa through an ion exchange resin that has the structure:

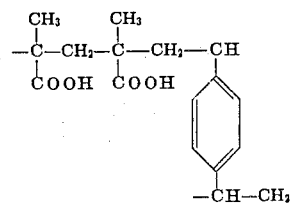

62. A process according to claim 41 wherein the spermatazoa fraction is obtained by a process including subjecting the spermatazoa to a vacuum of 15 to 30 cm. pressure differential from the pressure at which the spermatazoa was recovered from a male donor.

63. A process according to claim 41 wherein the spermatazoa fraction is obtained by a process including subjection the spermatazoa to a pressure greater than that at which the spermatazoa was recovered from a male donor.

64. A process according to claim 41 wherein the spermatazoa fraction is obtained by a process including,
washing and diluting spermatazoa recovered from a male donor,
placing the dilute solution containing spermatazoa in a counterstreaming centrifuge and the centrifuging for a period exceeding 20 minutes,
discontinuing centrifugation and removing the desired fraction from the dilutent.

65. A process according to claim 64 wherein during centrifugation a pressure differential from that pressure at which the spermatazoa were recovered from a male donor is applied to the spermatazoa.

66. A process according to claim 65 wherein the pressure differential is a vacuum of 15 to 30 cm.

67. A process according to claim 64 wherein there is an ion exchange resin within the centrifuge through which the spermatazoa percolate during centrifugation.

68. A process according to claim 41 wherein the spermatazoa fraction is obtained by a process including subjecting the spermatazoa to centrifugation at a speed less than 1000 r.p.m.

69. A process according to claim 41 wherein the spermatazoa fraction is obtained by a process including subjection of the spermatazoa to centrifugation at a speed greater than 1000 r.p.m and less than 1200 r.p.m.

70. A process according to claim 23 wherein individual ovum or cellular bodies intended for transplantation are stored for a period of time by a process including,
transferring an individual ovum or cellular body of the recovered ova having developed no further than the morula stage of differentiation in a small amount of fluid to a life support medium and container therefor,
cooling the container in a bath of fluid at a rate of less than 2°C. per minute,
at approximately 0°C. adding a like amount of buffer solution to said container,
then continuing the cooling of the container at a like rate of cooling until a stable frozen storage temperature for the ovum or cellular body is reached.

71. A process according to claim 70 wherein at approximately minus 4°C. the container is subjected to further cooling after seeding the fluid bath with a frozen crystal to initiate further cooling.

72. A process according to claim 70 wherein the zone pellicuda of the cellular body is removed before transfer to said container.

73. A process according to claim 24 wherein the frozen ova includes an oosphere which is subsequently thawed to approximately 0°C. and successive drops of sperm containing fluid is mixed with the culture medium until the amount of fluid medium is approximately .8 ml to 1 ml., and the medium is allowed to warm by exposure of its contained to air of normal ambient temperature for a period exceeding 3 hours.

74. A process according to claim 23 wherein a plurality of developing embryonic cellular bodies or ovum are transplanted to a single recipient, the number being transplanted being determined by the uterine capacity of the recipient so as not to exceed the uterine capacity.

75. A process for increasing the number of progeny of female omnivorous and herbivorous hoofed mammal donors comprising,
selecting a single ovum which has been recovered from a donor for transplantation,
separating one or more cells from other cells of said single ovum to obtain a plurality of like but separate embryonic cellular bodies which are separated and freed from other cells of said single ovum,
selecting individual seperated cellular bodies which have thus been separated and are capable of individual differentiation for transplantation,
and transplanting one or more of the selected individual separated cellular bodies which are capable of further differentiation and derived from the said single ovum to a recipient female for further maturation therein.

76. A process according to claim 75 wherein the selected ovum has been fertilized with a spermatazoa fraction of which the greated number will produce zygotes of a desired sex.

77. A process according to claim 75 wherein the cellular bodies are sexed before transplantation to a recipient.

78. A process according to claim 75 wherein the individual embryonic cells are separated and freed from other cells of said single ovum with the aid of a lysin solution.

79. A process according to claim 75 wherein said single ovum is asexually prepared from an oosphere recovered from the donor and has its chromozones all derived from its donor parent before said embryonic cells are separated from one another.

80. A process according to claim 75 wherein said transplanted separated cellular bodies are inserted within the zona pellicuda of a waiting ovum having its nuclear material destroyed before said one or more selected individual cellular bodies is transplanted to a recipient.

81. A process according to claim 75 wherein said transplanted separated cellular bodies are protected before transplantation by injecting the necular material of the separated cell into a foster cell which is ennucleated.

82. A differentiated cellular body derived according to the process of claim 75.

83. A process according to claim 75 wherein the donor has been superovulated and a plurality of ova recovered from the donor and one or more of the recovered ova are processed in accordance with the steps of claim 75.

84. A process according to claim 75 wherein the recipient has been administered gonadothrophin prior to the oestrus during which the transplantation of embryonic cells from the donor is performed.

85. A process for embryo transplantation for increasing the number of progeny of female omnivorous and herbivorous hoofed mammal donors comprising,
recovering an ovum from said donor,
separating one or more cells from said ovum after said ovum has divided but differentiated no further than the morula stage of development with the aid of a lysin solution into which the said ovum is placed and individual cells separated from other cells of the said ovum, thereby freeing individual embryonic cellular bodies which are capable of separate differentiation,
injecting individual cells which have been thus separated into a corresponding waiting waiting cellular body such that said waiting cellular body protects the injected individual cell from destruction and permits the individual cell to develop and differentiate as a seperate embryonic cell which is retarded in development as compared with the stage of development said original ovum would have reached had said individual cells not been seperated therefrom,
and subsequently transplanting one or more thus separated individual cells derived from the one ovum obtained from the donor to a recipient at a time such that the recipient is synchronized to receive the transplanted cells in accordance with their stage of differentiation.

86. The differentiated cellular body in accordance with the process according to claim 85.

87. A process for embryo transplantation for increasing the number of progeny of female omnivorous and herbivorous hoofed mammal donors comprising,
selecting a desired donor,
administering gonadothrophin to said donor to induce superovulation of said donor,
detecting oestrus in said donor, and inseminating said donor,
recovering a plurality of fertilized ova from said donor and storing said ova recovered from said donor in tissue culture medium at a temperature between 30°C. and 38°C.
selecting a plurality of prosepective recipients which are expected to ovulate at approximately the same time and injecting said prospective recipients with luteinizing hormone at approximately the same time,
selecting a stored ovum which has undergone several divisions and separating several of the cells of said selected ovum and freeing them from one another so as to provide a plurality of embryonic cells capable of further division and segregating said separate cells into groups originating from said selected ovum
withing 12 to 48 hours after the administration of luteinizing hormone transplanting one or more of said segregated and separated cells derived from said selected stored ovum to a selected recipient at a time corresponding to a synchronization of the said 12 to 48 hour period after hormone administration and a 12 to 48 hour period of development of each separated individual cell to be transplanted after said seperation and such that the transplant is synchronized at the blastocyst stage in the recipient at the time the recipient would normally implant a blastocyst of its own,
and repeating the transplantion for other cells in the same manner.

88. A process for embryo transplantation for increasing the number of progeny of female omnivorous and herbivorous hoofed mammal donors comprising,
inducing superovulation in a desired donor,
detecting oestrus in said donor,
inseminating said donor,
recovering fertilized ova from said donor by flushing said ova from the oviduct or uterus of the donor and removing said flushed ova from the donor and placing the recovered ova in a life support medium;

after recovery of the ova from the donor retarding development through differentiation of the ova by a retardation process,
said retardation process including a step of freezing the one or more recovered embryonic ova with a small amount of life support medium made available in a container, cooling the container in a fluid bath at a rate of less than 2°C. per minute and adding to said container at approximately 0°C. a like small mount of buffer solution and then continuing the cooling of the container to a temperature below 0°C. which is a stable storage temperature;
detecting oestrus in a prospective recipient,
selecting a stored ovum from said stored frozen ova and thawing said stored ovum which has been selected, and
transplanting said selected ovum to said prospective recipient at a time corresponding to a synchronization of said selected ovum and the time of fertilization of the recipient such that the transplant is synchronized at the blastocyst stage in the recipient at the time the recipient would normally implant a blastocyst of its own.

89. A process for embryo transplantation for increasing the number of progeny of female omnivorous and herbivorous hoofed mammal donors comprising,
inducing superovulation in a desired donor,
detecting oestrus in said donor, inseminating said donor, recovering fertilized ova from said donor by flushing said ova from the oviduct or uterus of the donor and removing said flushed ova from the donor and placing the recovered ova in a life support medium;

after recovery of the ova from the donor retarding development of the recovered ova by a retardation process, said retardation process including a step of selecting an ovum from said recovered ova and separating one or more cells from said ovum after said ovum has divided but differentiated no further than the morula stage of development with the aid of a lysin solution into which said ovum is placed and individual cells separated from other cells of the said selected ovum, thereby freeing individual embryonic cellular bodies which are capable of seperate differentiation, and storing said cellular bodies in tissue culture medium for a period of time;

detecting oestrus in a prospective recipient, selecting a stored cellular body from said culture medium, and transplanting said selected cellular body to said prospective recipient at a time corresponding to a synchronization of said selected cellular body at its stage of development and the time of fertilization of the recipient such that the transplant is synchronized at the blastocyst stage in the recipient at the time the recipient would normally implant a blastocyst of its own.

90. A process for embryo transplantation for increasing the number of progeny of female omnivorous and herbivorous hoofed mammal donors comprising, inducing superovulation in a desired donor, detecting oestrus in said donor, inseminating said donor, recovering fertilized ova from said donor by flushing said ova from the oviduct or uterus of the donor and removing said flushed ova from the donor and placing the recovered ova in a life support medium, determining the sex of each of the recovered ova by a microscopic examination of one or more cells of each ovum, thereafter retarding development of the recovered ova by a retardation process and storing said recovered and retarded ova in a life support medium for a period of time, detecting oestrus in a prospective recipient, selecting a stored ovum or a plurrlity of stored ova from said stored ova, all selected ova being of like sex, and transplanting said selected ovum or plurality of stored ova of like sex to said prospective recipient at a time corresponding to a synchronization of said selected ovum and the time of fertilization of the recipient such that the transplant is synchronized at the blastocyst stage in the recipient at the time the recipient would normally implant a blastocyst of its own.

91. A process for embryo transplantation for increasing the number of progeny of female omnivorous and herbivorous hoofed mammal donors comprising, inducing superovulation in a desired donor, detecting oestrus in said donor, inseminating said donor with spermatazoa from a fraction of spermatazoa of which the greater number will produce zygotes of a desired sex, recovering fertilized ova from said donor by flushing the said ova from the oviduct or uterus of the donor and removing said flushed ova from the donor and placing the recovered ova in a life support medium, examining one or more cells of the recovered ova to determine the sex of the cells of the ovum from which the cells being examined are derived and segregating the embryonic ova in accordance with their sex, subjecting said recovered ova to a retardadation process which retards normal development of the ova and storing said recovered ova for a period of time, detecting oestrus in a prospective recipient, selecting one or more stored ova of like sex from storage, and transplanting said selected ovum to said prospective recipient at a time such that the transplant is synchronized at the blastocyst stage in the recipient at the time the recipient would normally implant a blastocyst of its own.

92. A process for embryo transplantation for increasing the number of progeny of female omnivorous and herbivorous hoofed mammal donors comprising, inducing superovulation in a desired donor, detecting oestrus in said donor, inseminating said donor, recovering fertilized ova from said donor by flushing the said ova from the oviduct or uterus of the donor and removing said flushed ova and placing the recovered ova in a life support medium, examining one or more cells of the recovered ova to determine the sex of the cells of the ovum from which the cells being examined are derived and segregating the embryonic ova in accordance with their sex, subjecting said recovered ova to a retardation process which retards normal development of the ova and permits prolonged storage of the recovered ova, said retardation process including a step of freezing one or more recovered embryonic ova with a small amount of life support medium made available in a container, cooling the container in a fluid bath at a rate of less than 2°C. per minute and adding to said container at approximately 0°C. a like small amount of buffer solution and then continuing the cooling of the container to a temperature below 0°C. which is a stable storage temperature;

detecting oestrus in a prospective recipient, selecting from storage one or more recovered ova of like sex and thawing said selected ova, and transplanting said selected ovum or ova to said recipient at a time corresponding to a synchronization of said selected ova and the time of fertilization of the recipient such that the transplant is synchronized at the blastocyst stage in the recipient at the time that the recipient would normally implant a blastocyst of its own.

93. A process for embryo transplantation for increasing the number of progeny of female omnivorous and herbivorous hoofed mammal donors comprising, inducing superovulatin in a desired donor, detecting oestrus in said donor,
inseminating said donor,
recovering fertilized ova from said donor by flushing the said ova from the oviduct or uterus of the donor and removing said flushed ova and placing the recovered ova in a life support medium,
examining one or more cells of the recovered ova to determine the sex of the cells of the ovum from which the cells being examined are derived and segregating the embryonic ova in accordance with their sex,
subjecting said recovered ova to a retardation process which retards normal development of the ova and permits prolonged storage of the recovered ova, said retardation process including separating one or more cellular bodies from a single ovum after the single ovum has divided but differentiated no further than the morula stage of development to seperate and free individual embryonic cellular bodes from each other which are of the same sex and derived from the same individual and are capable of sperate differentiation but retarded in their stage of division as compared to the stage which would have been reached by the single ovum from which they are derived, and
freezing said recovered ova or cellular bodies at a cooling rate of less than 2°C. per minute with a small amount of buffer solution added at approximately 0°C. and then the cooling is continued to a stable storage temperature below freezing at approximately the same rate of cooling,
and subsequently selecting one or more ova or cellular bodies of the same sex and thawing the same and then transplanting said selected ova or cellular bodies to a recipient at a time such that the transplant is synchronized at the blastocyst stage in the recipient at the time that the recipient would normally implant a blastocyst of its own during normal development after fertilization.

94. A differentiated cellular body derived by the process according to claim 87.

95. A differentiated cellular body derived by the process according to claim 88.

96. A differentiated cellular body derived by the process according to claim 89.

97. A differentiated cellular body derived by the process according to claim 90.

98. A differentiated cellular body derived by the process according to claim 91.

99. A differentiated cellular body derived by the process according to claim 92.

100. A differentiated cellular body derived by the process according to claim 93.

* * * * *